United States Patent

[11] 3,554,353

| | | |
|---|---|---|
| [72] | Inventor | John L. Raudat<br>North Madison, Conn. |
| [21] | Appl. No. | 760,563 |
| [22] | Filed | Sept. 18, 1968 |
| [45] | Patented | Jan. 12, 1971 |
| [73] | Assignee | Emhart Corporation<br>Bloon.field, Conn.<br>a corporation of Connecticut |

[54] ADJUSTABLE LANE GUIDES
9 Claims, 5 Drawing Figs.

[52] U.S. Cl. .................................................. 198/30,
198/204
[51] Int. Cl. ............................................. B65g 47/26
[50] Field of Search .......................................... 198/30,
204, 205

[56] References Cited
UNITED STATES PATENTS

| | | | |
|---|---|---|---|
| 1,501,285 | 7/1924 | Lawrence..................... | (198/30UX) |
| 2,951,574 | 9/1960 | Craig........................... | 198/30 |

*Primary Examiner*—Hugo O. Schulz
*Attorney*—McCormick, Paulding & Huber

ABSTRACT: A plurality of laterally adjustable lane guides are mounted on a rectangular frame, which frame is itself adjustable laterally on fixed posts adjacent the sides of a conveyor. A pair of cross-shafts rotatably mounted in the frame threadably receive left and right hand nuts adjacent their respective end portions, which nuts carry the outside lane guides so that rotation of the shafts moves both guides toward or away from one another. Additional lane guides slidably mounted on unthreaded intermediate portions of these cross-shafts are separated from one another by coil springs to assure that they remain equally spaced from one another as the cross-shafts are so rotated.

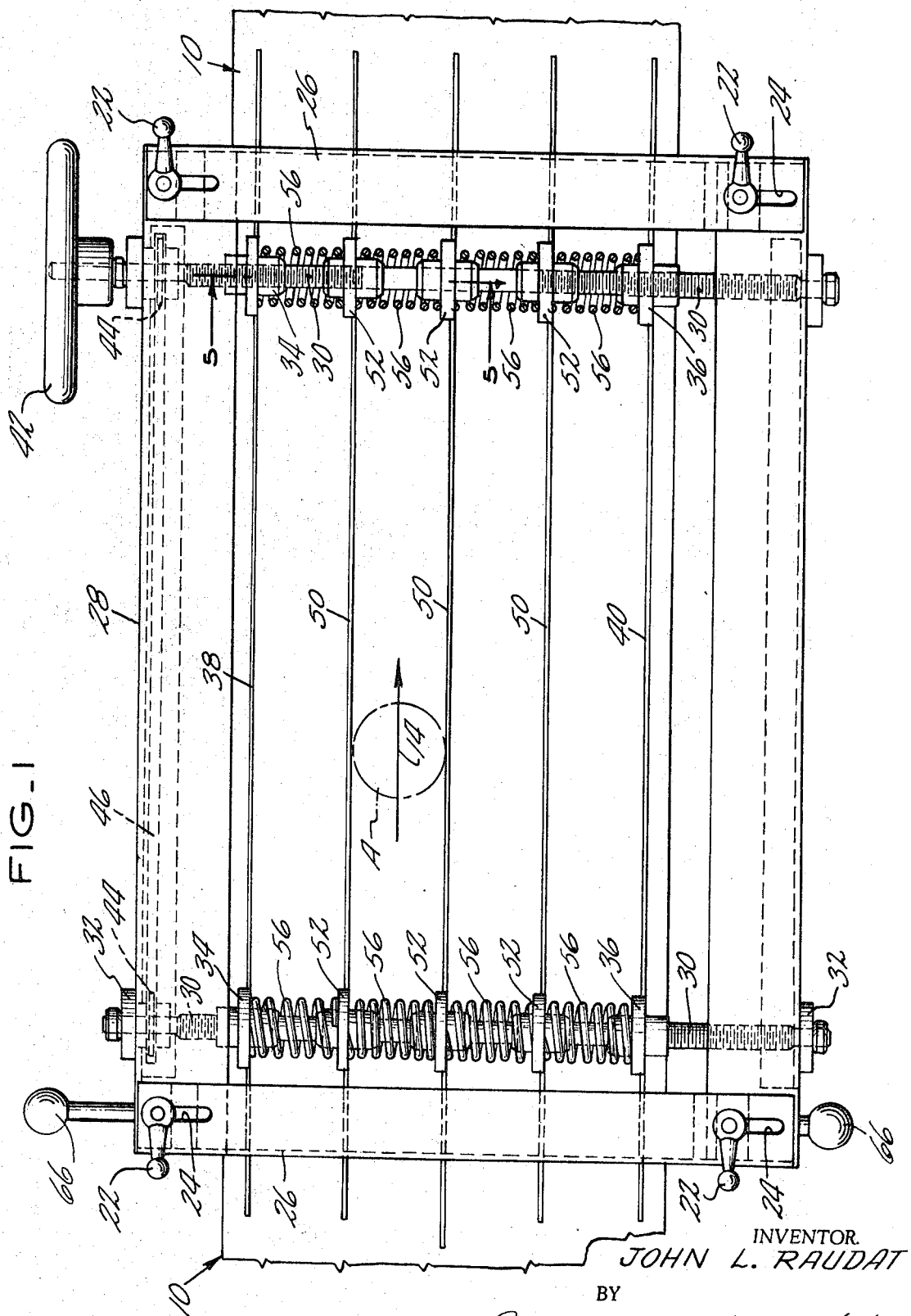

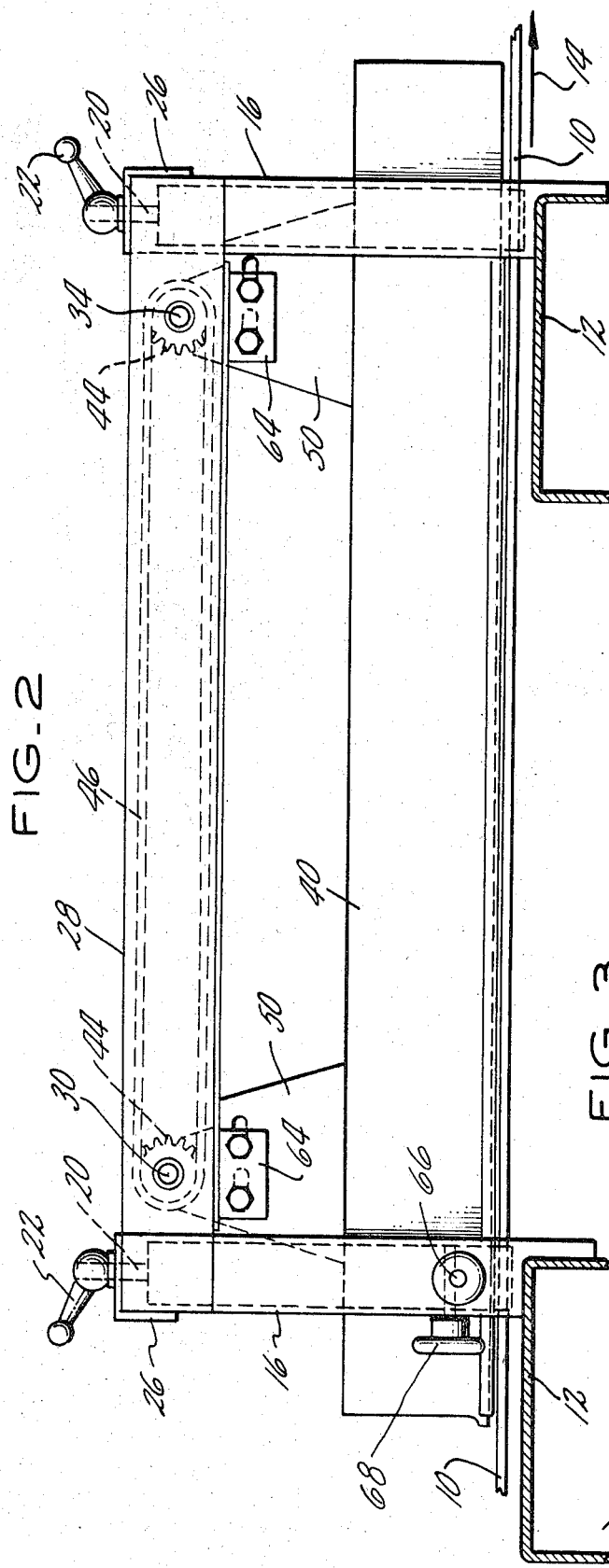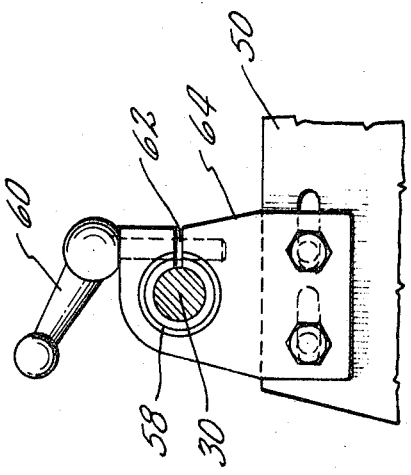

PATENTED JAN 12 1971
3,554,353
SHEET 3 OF 3
FIG._4
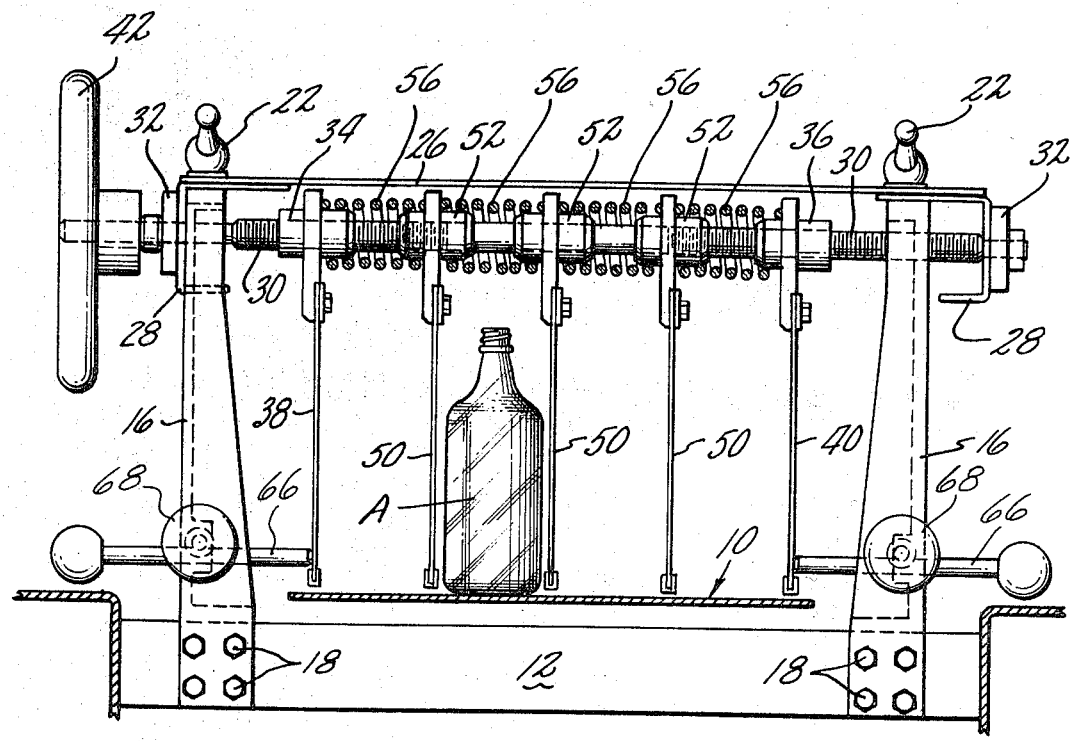
FIG._5
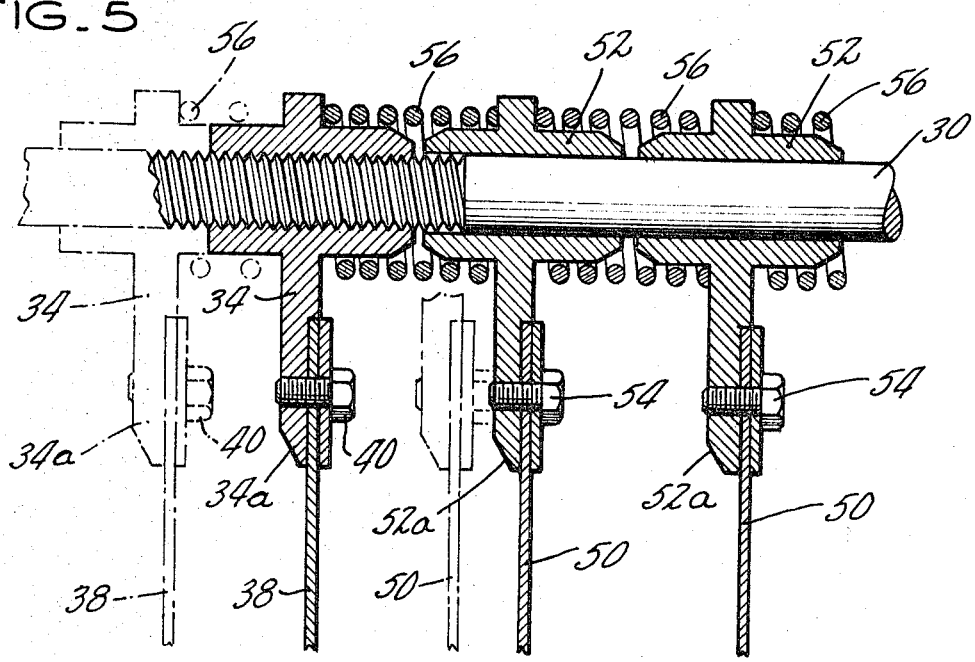
INVENTOR.
JOHN L. RAUDAT
BY
McCormick, Paulding & Huber
ATTORNEYS 3,554,353

ADJUSTABLE LANE GUIDES

SUMMARY OF INVENTION

This invention relates to lane guides of the type used above a belt type conveyor for aligning articles fed therealong and deals more particularly with lane guides which are adjustable laterally to accommodate articles of various size.

A general object of the present invention is to provide adjustable lane guides of the foregoing character wherein all of the lane guides are adjustable collectively with respect to the conveyor to align the lanes defined therebetween with those of a packer or other articles handling apparatus downstream thereof.

Another general object of the present invention is to provide a device of the foregoing character wherein a plurality of lane guides are provided in a frame, which frame includes means for adjustably mounting all of the guides for movement toward or away from one another while preserving the equidistant spacing between these guides.

Still another object of the present invention is to provide a device of the foregoing character wherein an even or an odd number of lanes can be set up quickly and conveniently by manipulation of a single handwheel and several hand screws.

BRIEF DESCRIPTION OF THE DRAWINGS

FIG. 1 is a plan view of an apparatus constructed in accordance with the present invention with portions thereof broken away to reveal one of the cross-shafts in the frame which supports the lane guides adjustably above a conveyor belt of the type adapted to convey articles continuously in one direction.

FIG. 2 is an elevational view of the apparatus shown in FIG. 1.

FIG. 3 is an alternative construction for one of the individual lane guide mounting collars and associated bracket portion shown in FIGS. 1 and 2.

FIG. 4 is an end view of the apparatus shown in FIGS. 1 and 2.

FIG. 5 is a vertical sectional view taken on the line 5-5 of FIG. 1 showing several of the lane guides in alternative positions in solid and broke lines.

DETAILED DESCRIPTION

Turning now to the drawings in greater detail, FIGS. 1, 2, and 4 show a continuously operated conveyor belt 10 of conventional construction, and having a support frame 12 which is fixed and having suitable means for continuously operating the conveyor in the direction of the arrow 14 for conveying articles therealong as indicated schematically in FIG. 1. In accordance with the present invention, four fixed support post means 16, 16 are provided adjacent the marginal side edges of the moving conveyor 10 for supporting a rectangular frame above the conveyor in an adjustable manner to be described. The lower end of each support post 16 is secured to the fixed framework of the conveyor 12 by suitable means, as for example the screws 18, 18 shown in FIG. 4. The rectangular frame is adjustably mounted to the upper ends of the support posts 16, 16, and more particularly to studs 20, 20 provided in the upper ends of the support posts by hand screws 22, 22 which are adapted to clamp the frame to the support posts in a range of positions defined by the lengths of the slots 24, 24 in the crossbars 26, 26 of the frame itself.

The frame also includes longitudinally extending channel-shaped members 28, 28 the end portions of which are attached to the contiguous end portions of the crossbars 26, 26 to define the rectangular frame. Two cross-shafts 30, 30 are rotatably supported in the frame just inboard of the cross members 26, 26, and more particularly, bearings 32, 32 are provided in the web portion of the longitudinally extending channel members 28, 28 for rotatably receiving the end portions of the cross-shafts 30, 30.

Each cross-shaft has a left-hand threaded potion and a right-hand threaded portion separated by an unthreaded intermediate portion. Correspondingly threaded nut means 34, 34 and 36, 36 are threadably received thereon. The left-hand threaded nut means 34, 34 support one outside lane guide 38 located adjacent one marginal side edge of the conveyor 10, while the right-hand threaded nut means 36, 36 support the opposite outside lane guide 40 adjacent opposite marginal side edge of the conveyor 10. As best shown in FIGS. 4 and 5, each of the nut means 34 and 36 includes a depending lug or bracket portion 34a to which the associated lane guide 38 is adapted to be attached, as for example by the screw 40. As so constructed and arranged, it will be apparent that rotation of the cross-shaft 30 by means of the handwheel 42 in one direction will increase the lateral spacing between the outside lane guides 38 and 40, and that rotation in the opposite direction will serve to decrease the spacing between the outside lane guides 38 and 40.

As best shown in FIGS. 1 and 2 each cross-shaft 30, 30 also carries a sprocket 44, 44 and a chain is entrained around these sprockets as indicated generally at 46 so that rotation of the single handwheel 42 serves to rotate both cross-shafts in unison with one another.

In further accordance with the present invention, additional lane guides 50, 50 are provided intermediate the outside line guides 38 and 40. As best shown in FIGS. 4 and 5, each of these additional lane guides 50 is slidably supported from the cross-shafts 30, 30 on collar means 52. Each collar means is slidably supported on one of the cross-shafts as shown in FIG. 5, and each collar means has a depending lug or bracket portion 52a to which the lane guide 50 is attached by a screw 54. Spring means is provided between the additional lane guide 50 and the adjacent outside lane guide either between the outside lane guide associated with the nut means 34 to space that additional lane guide either between the outside lane guides 38 and 40 in the event that only a single additional lane guide is utilized, or to space the central lane guide 50 intermediate between the adjacent additional lane guides 50, 50 as best shown in FIG. 4. It will be apparent that any number of such slidably supported lane guides can be provided between the outside lane guides 38 and 40 associated with the left- and right-hand threaded nut means 34 and 36. Preferably, the collar means 52 on each cross-shaft 30 are separated from one another, and from the nut means 34 and 36, by coil springs 56, 56 of equal size and spring force to assure that the above-mentioned equidistant spacing between adjacent lane guides 38, 50 and 40 is preserved during adjustment. While these springs serve to maintain the spacing between the lane guides even after the adjustments have been made, FIG. 3 shows an alternative construction wherein the collar means 52 is replaced by a collar means 58 having a slot 62 in its depending lug or bracket portion 64. A hand knob 60 on a threaded shaft received in the bracket portion 64 serves to securely lock the additional lane guides 50, 50 in their selected positions in the event that the articles to be handled are found to move these guides against the restraining forces imposed thereon by the coil springs.

From the foregoing description it will be apparent that the lane guides can be set up to accommodate either an odd or even number of lanes as a result of the slots 24, 24 being at least as long as one half the maximum lane width.

Finally, in order to prevent outward movement of the lower edges of the outside lane guides 38 and 40 adjacent the marginal side edges of the conveyor, stop means are provided as indicated generally at 66. These stop means are adjustably locked in position by hand screws 68, 68.

I claim:

1. A device for guiding articles as they are advanced by a belt type conveyor, said device comprising fixed means supported above the conveyor, at least one cross-shaft rotatably supported in said fixed means and extending across the conveyor, said cross-shaft having left- and right-hand threaded portions, two outside land guides for maintaining the articles in lanes on the conveyor, threaded nut means for supporting said outside lane guides from said cross-shaft so that rotation of said cross-shaft in one direction increases the lateral spacing between said outside lane guides and rotation in the opposite direction decreases such spacing, collar means slidably supported on unthreaded portions of said cross-shaft intermediate said right and left hand threaded portions thereof, at least one additional lane guide supported by said collar means and located between said outside lane guides, and spring means between each said lane guide and said lane guide adjacent thereto for maintaining said lane guides in equidistantly spaced relation.

2. A device as defined in claim 1 including two cross-shafts rotatably supported in longitudinally spaced relation in said fixed means, each of said cross shafts having corresponding left- and right-hand threaded portions, and threaded nut means associated with each of said cross-shafts for supporting said lane guides.

3. A device as defined in claim 2 and further characterized by means for rotating both cross-shafts in unison with one another to adjust the spacing between said lane guides.

4. A device as defined in claim 1 wherein a plurality of additional lane guides are provided between said outside lane guides, and wherein collar means are provided for slidably supporting said additional guides, said spring means being provided between all of said guides to permit adjusting the spacing between all of said guides by rotating said cross-shafts.

5. A device as defined in claim 4 wherein said fixed means comprises support posts adjacent the sides of the conveyor, and frame means adjustably mounted to said support means to allow collective lateral adjustments to all of said lane guides with respect to the conveyor.

6. A device for guiding articles as they are advanced by a conveyor, said device comprising a frame assembly including a frame supported above the conveyor and at least one cross-shaft supported for axial rotation by said frame and extending transversely of the conveyor, two longitudinally extending outside lane guides supported by said frame assembly for transverse movement relative to the conveyor and to each other, drive means for simultaneously moving said outside lane guides generally toward and away from each other respectively in response to rotation of said cross-shaft in one and the opposite direction and for retaining said outside lane guides in fixed position relative to said frame assembly, at least one additional longitudinally extending lane guide supported by said frame assembly between said outside lane guides for movement relative thereto in said transverse direction, said one lane guide being movable relative to said cross-shaft and said outside lane guides independently of rotation of said cross-slide, and resilient means for maintaining said lane guides in equidistantly spaced relation to each other, said additional lane guide being movable in a generally transverse direction relative to said outside lane guides when said outside lane guides are retained in said fixed position.

7. A device defined in claim 6, wherein said lane guides are supported on said cross-shaft and said one lane guide is supported thereon for sliding movement relative thereto and said resilient means comprises a plurality of springs, each of said springs acting between one of said lane guides and another of said lane guides adjacent thereto.

8. A device as defined in claim 6, including means for releasably locking said one lane guide against movement relative to said outside lane guides.

9. A device as defined in claim 6, including adjustable stop means associated with said frame assembly and transversely adjustable relative to said frame assembly and the conveyor for selectively limiting movement of said outside lane guides in response to rotation of said cross-shaft in said opposite direction--.

PO-1050
(5/69)

UNITED STATES PATENT OFFICE
CERTIFICATE OF CORRECTION

Patent No. 3,554,353                    Dated  January 12, 1971

Inventor(s)  John L. Raudat

It is certified that error appears in the above-identified patent and that said Letters Patent are hereby corrected as shown below:

Col. 1, line 14, "articles" should read --article--.

Col. 2, line 8, following "adjacent" --the-- should be inserted.

Col. 2, line 26, "line" should read --lane--.

Col. 2, lines 33 -

Reads:  "Spring means is provided between the additional lane guide 50 and the adjacent outside lane guid either between the outside lane guide associated with the nut means 34 to space that additional lane guide either between the outside lane guide 38"

Should read:

--Spring means is provided between the additiona lane guide 50 and the adjacent outside lane guid associated with the nut means 34 to space that additional lane guide either between the outside lane guides 38--

Col. 2, line 75, "land" should read --lane--.

Signed and sealed this 27th day of April 1971.

(SEAL)
Attest:

EDWARD M. FLETCHER, JR.                WILLIAM E. SCHUYLER, JF
Attesting Officer                      Commissioner of Patent